Oct. 7, 1924.

E. F. PAWSAT

MUDGUARD BRACKET

Filed Dec. 12, 1921

1,510,603

Ewald F. Pawsat INVENTOR.

BY

Erwin, Wheeler & Woolard ATTORNEYS.

Patented Oct. 7, 1924.

1,510,603

UNITED STATES PATENT OFFICE.

EWALD F. PAWSAT, OF SHEBOYGAN, WISCONSIN.

MUDGUARD BRACKET.

Application filed December 12, 1921. Serial No. 521,960.

*To all whom it may concern:*

Be it known that I, EWALD F. PAWSAT, a citizen of the United States, residing at Sheboygan, county of Sheboygan, and State of Wisconsin, have invented new and useful Improvements in Mudguard Brackets, of which the following is a specification.

This invention relates to improvements in mud guard brackets and the process of making the same, with particular reference to brackets adapted to support the mud guards of such light vehicles as motorcycles or bicycles.

Brackets of this sort are ordinarily stamped from some suitable metal and then bent to the desired shape. As is well known in the art, the shape of this device is that of an inverted U, the legs of which are provided with means whereby they may be supported from the frame of the bicycle, ordinarily adjacent an axle. Centrally at the top of the device it is customary to provide a hole through which a securing bolt may be passed to fasten the mud guard to the bracket. It will be noted that the location of this hole corresponds with the point at which the metal of the bracket is most severely strained during the bending process by which the bracket is shaped. As a consequence of the bending and of the location of the bolt hole at this point, the mud guard brackets hitherto constructed have frequently broken at the point thus weakened.

It is, therefore, the object of this invention to provide means of a simple and inexpensive nature for re-enforcing a mud guard bracket at this point where experience has shown such brackets to be particularly subject to breakage. It is also an object of this invention to provide re-enforcing means for a mud guard bracket which will be inconspicuous and will not project so far downwardly below the normal position of the mud guard bracket as to risk an injury to the tire, such as might be caused by a bulky re-enforcing means.

It is a further object of this invention to provide a mud guard bracket with re-enforcing means which is adapted to co-operate with the nut of a securing bolt to keep the nut from turning while the bolt is being manipulated.

It is a further object of this invention to provide a mud guard bracket built up of a plurality of members, each of which is adapted to be formed in one operation by stamping from metal having the desired characteristics, whereby labor and material may be saved.

In the drawings:—

Like parts are identified by the same reference characters throughout the several views.

Figure 1:
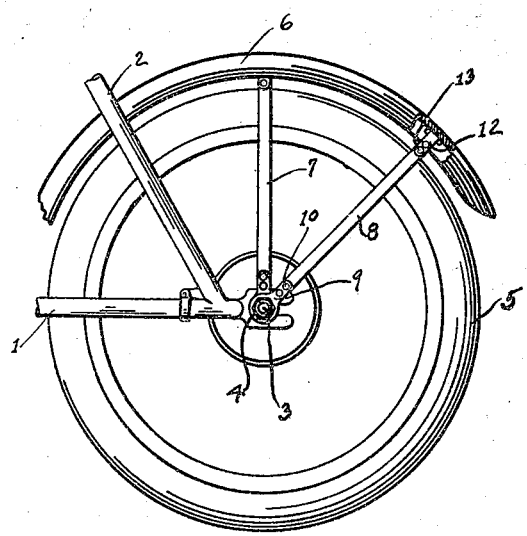
Figure 1 is a side elevation of a mud guard bracket embodying this invention, applied to the rear wheel of a bicycle.

1 and 2 represent the frame members of a bicycle of ordinary construction. 3 is the rear axle of the bicycle and 4 is the nut by which the axle is secured to the frame. 5 is the rear wheel of the bicycle which is mounted for rotation upon the axle 3. 6 represents the mud guard as it appears supported by brackets embodying this invention. These brackets will hereinafter be designated in their entirety by the numeral 7.

Each of the brackets 7 includes two straight side members 8 provided at their lower extremities with the eye members 9 which are suitably apertured to receive the axle shaft 3 to which they are secured by the pressure of the nut 4. Each of the eye pieces 9 is preferably made fast to its adjacent side member 8 by means of rivets or similar securing means indicated at 10.

The two side members 8 of each bracket 7 are joined at their upper ends by means of a bowed member 12 which preferably comprises a separate stamping, for reasons which will hereinafter be set forth. Rivets 13 may be used to secure the member 12 to the side bars 8 of the bracket.

It is frequently desirable to use different kinds of metal in the different portions of a mud guard bracket. For example, the straight side members 8 are preferably made of material which is comparatively stiff and unyielding, so that a bracket of great strength and supporting power will result. Metal of sufficient hardness for the side members 8, however, cannot readily be bent to the form of the bowed portion 12 of the bracket without increasing the tendency toward breakage at this point.

It is also desirable to cut the portions 12 of the bracket in blanks of considerable greater width than the side members 8 thereof. The eye pieces 9 are also of greater width than the side members 8. It will be clear that when each bracket is struck or stamped from a single piece of metal, it is necessary to waste a considerable portion of the metal lying between adjacent blanks, and the manufacture of such brackets is expensive relative to the manufacture of brackets of the type disclosed herein. In addition to the difficulty previously referred to, of accommodating the various portions of the bracket to the various conditions which these portions must meet, there is, therefore, in the manufacture of mud guard brackets of ordinary construction, a considerable waste of material. In my improved method, the side members 8 for great quantities of brackets, may all be stamped without any waste whatever from a sheet of suitable metal. The members 12 may then be cut with very little wastage from a second sheet of metal of such quality as to permit of the bending of these members without the production of unnecessary strains therein.

A further reason why a built up mud guard is preferred in connection with this invention is that where the member 12 is separately stamped, the manipulation incident to its bending and the formation of the re-enforcing means thereon is rendered simpler than would be the case if the lengthy arms 8 had to be provided for during the shaping operation.

Figure 3:
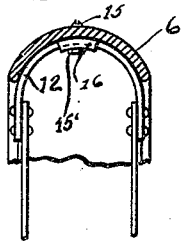
Figure 3 is a detail showing the upper part of my improved mud guard bracket in rear elevation.
Figure 2:
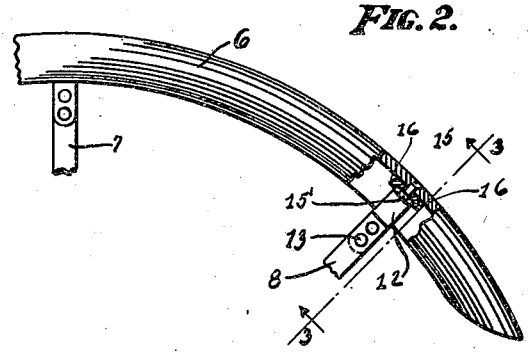
Figure 2 is a detail of the same showing the preferred re-enforcing means.
Figure 4:
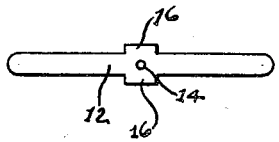
Figure 4 is a plan view of the blank from which the curved portion of my improved mud guard bracket may be formed.

The member 12 in such a mud guard will now be described. This member may be provided with substantially parallel sides except at its central portion where the member is apertured at 14 to receive a bolt 15 which carries a nut 15' by which the member 12 may be secured to mud guard 6. Upon each side of the member 12 adjacent its central portion a projecting flange 16 is formed at the time the blank is stamped from the original sheet of metal. These flanges 16 are bent downwardly in the manner clearly illustrated in Figure 2 to give the member 12 a channeled cross section at this point. The downwardly bent flanges also increase the width of member 12 to some extent. This downward bending of flanges 16 may be done simultaneously with their forming, and at the same time the ends of member 12 may be bent to give the member the U shape in which it is shown in Figure 3. It has been found that the re-enforcement provided by the downwardly bent re-enforcing flanges 16 is amply sufficient in itself to provide against the breakage which has hitherto occurred at this point in the mud guard brackets of ordinary construction. In reaching this result the flanges need not be extended below member 12 for any great distance. In practice it is found that the flanges do not need to be longer than the thickness of member 12. It is sufficient that they extend a very slight distance below the lower surface of member 12.

In addition to the re-enforcement provided by flanges 16, it will be clear that these flanges may also provide means for securing a nut 15' against rotation while a bolt 15 is being screwed through the opening 14 to draw together the bracket 7 and mud guard 6.

It will be clear from the foregoing that the bracket herein disclosed fulfills the objects specified. The legs or side members 8, the eye members 9, and the bowed central portions 12 are all stamped separately from different sheets of metal, thereby saving a great deal of material and labor, and enabling different grades or kinds of metal to be used for each member when this practice seems desirable. By reason of the fact that the central portions 12 are separately formed and are not integral with the unwieldy legs 8 it is possible to shape this member in one operation without cumbersome machinery, the flanges 16 being bent inwardly to re-enforcing position while the ends are simultaneously flexed to produce the desired bow shape in this member. The several elements may now be quickly assembled by riveting, the finished product being not only much more serviceable, but far cheaper by reason of the economies made possible by the method described herein.

I claim:

1. A mud guard bracket provided with a bolt hole intermediate of its ends, and a pair of flanges integral with the intermediate portion of said bracket and extending downwardly, whereby said bracket is of channeled cross section adjacent said bolt hole.

2. In a mud guard bracket, the combination with a pair of side members, of an intermediate member bowed to conform to a mud guard, and provided with a bolt hole in said bowed portion, and re-enforcing flanges formed integral with said intermediate member immediately adjacent said bolt hole and extending downwardly.

3. In a mud guard bracket provided with a bowed intermediate portion adapted to conform to a mud guard and with a bolt hole in said portion, a pair of downwardly extending flanges integral with opposite sides of said bowed portion immediately adjacent the bolt hole, and spaced to receive the nut of a bolt inserted through said hole, whereby such a nut may be engaged between said flanges to prevent its turning and the portion including the bolt hole may be reenforced.

EWALD F. PAWSAT.